(12) United States Patent
Gumina et al.

(10) Patent No.: US 12,002,632 B2
(45) Date of Patent: Jun. 4, 2024

(54) ANYWHERE WIRELESS SWITCH AND/OR DIMMER

(71) Applicant: Leviton Manufacturing Co., Inc., Melville, NY (US)

(72) Inventors: Ronald J. Gumina, Mandeville, LA (US); James Shurte, New Orleans, LA (US); Michael Kamor, North Massapequa, NY (US); Stephen Aaron, East Patchogue, NY (US); Aaron Ard, Ponchatoula, LA (US)

(73) Assignee: Leviton Manufacturing Co., Inc., Melville, NY (US)

( * ) Notice: Subject to any disclaimer, the term of this patent is extended or adjusted under 35 U.S.C. 154(b) by 521 days.

(21) Appl. No.: 17/066,680

(22) Filed: Oct. 9, 2020

(65) Prior Publication Data
US 2022/0115189 A1    Apr. 14, 2022

(51) Int. Cl.
*H01H 9/02* (2006.01)
*H01H 1/58* (2006.01)
(Continued)

(52) U.S. Cl.
CPC .......... *H01H 13/04* (2013.01); *H01H 1/5805* (2013.01); *H01H 3/12* (2013.01);
(Continued)

(58) Field of Classification Search
None
See application file for complete search history.

(56) References Cited

U.S. PATENT DOCUMENTS

| 3,958,869 A | 5/1976 | Beck |
| 4,514,789 A | 4/1985 | Jester |

(Continued)

FOREIGN PATENT DOCUMENTS

| CN | 211088619 U | 7/2020 |
| DE | 102011088653 A1 | 6/2013 |

(Continued)

OTHER PUBLICATIONS

Author Unknown., "The Anywhere Switch/Switch Kit" Leviton Mfg. Co,. Inc. 2013, 2 pages.
(Continued)

*Primary Examiner* — Felix O Figueroa
(74) *Attorney, Agent, or Firm* — KDW FIRM PLLC

(57) ABSTRACT

An electrical device such as, for example, a battery-powered electrical switch is disclosed. The battery-powered wireless switch includes one or more mechanisms arranged and configured to provide simplified access for servicing (e.g., replacing) the batteries located within the wireless switch. In one embodiment, the wireless switch is arranged and configured so that the batteries may be accessed by reconfiguring the wireless switch from a first closed position to a second opened position to access the batteries. Thus arranged, removal of the wireless switch from a wall-box or a surface of a wall is not required, the user may only need to remove the wall-plate in order to reconfigure the wireless switch. In one embodiment, at least a portion of the wireless switch is pivoted from the first position to the second position to provide access to the batteries.

13 Claims, 14 Drawing Sheets

(51) Int. Cl.
*H01H 3/12* (2006.01)
*H01H 3/16* (2006.01)
*H01H 13/04* (2006.01)
*H01H 23/04* (2006.01)
*H05B 47/19* (2020.01)

(52) U.S. Cl.
CPC .......... *H01H 3/162* (2013.01); *H01H 9/0264* (2013.01); *H01H 9/0271* (2013.01); *H01H 23/04* (2013.01); *H01H 2207/032* (2013.01); *H01H 2221/00* (2013.01); *H01H 2229/042* (2013.01); *H05B 47/19* (2020.01)

(56) References Cited

U.S. PATENT DOCUMENTS

| | | |
|---|---|---|
| 4,654,745 A | 3/1987 | Corby |
| 4,939,792 A | 7/1990 | Urbish et al. |
| D310,814 S | 9/1990 | Rosenbaum et al. |
| D310,815 S | 9/1990 | Watson et al. |
| D312,611 S | 12/1990 | Watson et al. |
| 5,079,559 A | 1/1992 | Umetsu et al. |
| 5,206,657 A | 4/1993 | Downey |
| 5,239,205 A | 8/1993 | Hoffman et al. |
| 5,336,979 A | 8/1994 | Watson et al. |
| 5,340,954 A | 8/1994 | Hoffman et al. |
| 5,436,421 A | 7/1995 | Sadowski |
| 5,485,058 A | 1/1996 | Watson et al. |
| D369,143 S | 4/1996 | Sorenson |
| 5,565,855 A | 10/1996 | Knibbe |
| 5,570,085 A | 10/1996 | Bertsch |
| 5,621,283 A | 4/1997 | Watson et al. |
| 5,637,964 A | 6/1997 | Hakkarainen et al. |
| 5,663,862 A * | 9/1997 | Hopping-Mills ........ H01H 9/22 361/747 |
| 5,703,329 A | 12/1997 | Delone |
| D389,461 S | 1/1998 | Mayo et al. |
| D389,805 S | 1/1998 | Mayo et al. |
| D391,924 S | 3/1998 | Mayo et al. |
| 5,736,965 A | 4/1998 | Mosebrook et al. |
| D395,037 S | 6/1998 | Mayo et al. |
| 5,818,128 A | 10/1998 | Hoffman et al. |
| 5,838,226 A | 11/1998 | Houggy et al. |
| 5,842,032 A | 11/1998 | Bertsch |
| 5,844,516 A | 12/1998 | Viljanen |
| 5,848,054 A | 12/1998 | Mosebrook et al. |
| 5,938,757 A | 8/1999 | Bertsch |
| D416,871 S | 11/1999 | Todd |
| 5,982,103 A | 11/1999 | Mosebrook et al. |
| 6,011,226 A | 1/2000 | Sadowski et al. |
| 6,013,885 A | 1/2000 | Kowalczyk |
| 6,169,377 B1 | 1/2001 | Bryde et al. |
| 6,326,754 B1 | 12/2001 | Mullet et al. |
| 6,397,288 B1 | 5/2002 | Rye et al. |
| 6,423,900 B1 | 7/2002 | Soules |
| 8,340,975 B1 | 12/2012 | Rosenberger |
| 9,401,252 B2 * | 7/2016 | Keirstead ............... H01H 23/04 |
| 9,589,461 B1 * | 3/2017 | Byrne .................... G08C 19/00 |
| 9,818,559 B2 * | 11/2017 | Tress ..................... H01H 23/04 |
| 9,978,547 B1 | 5/2018 | Wisniewski et al. |
| 10,386,891 B2 * | 8/2019 | Allen ...................... H04L 12/00 |
| 10,475,596 B2 * | 11/2019 | Dimberg ................. H01H 9/02 |
| 10,852,771 B2 | 12/2020 | Allen et al. |
| 2003/0075351 A1 * | 4/2003 | Chang .................... H01H 13/70 174/491 |
| 2004/0202343 A1 | 10/2004 | Rye et al. |
| 2008/0001549 A1 | 1/2008 | Altonen et al. |
| 2011/0129097 A1 | 6/2011 | Andrea |
| 2012/0129372 A1 | 5/2012 | Le Page |
| 2013/0257315 A1 | 10/2013 | Restrepo et al. |
| 2014/0246218 A1 | 9/2014 | Shotey |
| 2014/0262848 A1 | 9/2014 | Fathollahi et al. |
| 2014/0353130 A1 * | 12/2014 | Sekikawa ................ H01H 9/22 200/50.03 |
| 2015/0078555 A1 | 3/2015 | Zhang et al. |
| 2015/0156598 A1 | 6/2015 | Sun et al. |
| 2015/0215747 A1 | 7/2015 | Kemmerer, Jr. et al. |
| 2015/0256355 A1 | 9/2015 | Pera et al. |
| 2015/0341072 A1 | 11/2015 | Lai et al. |
| 2016/0110154 A1 | 4/2016 | Qureshi et al. |
| 2016/0111837 A1 | 4/2016 | Misener |
| 2016/0219682 A1 | 7/2016 | Altonen et al. |
| 2016/0363143 A1 | 12/2016 | Druce et al. |
| 2017/0027043 A1 | 1/2017 | Greene et al. |
| 2017/0188437 A1 | 6/2017 | Banta |
| 2017/0208657 A1 | 7/2017 | Jensen |
| 2017/0271921 A1 | 9/2017 | Lombardi et al. |
| 2018/0054688 A1 | 2/2018 | Cartwright et al. |
| 2018/0063249 A1 | 3/2018 | Nguyen |
| 2018/0084627 A1 | 3/2018 | Recker et al. |
| 2018/0124903 A1 | 5/2018 | Strods et al. |
| 2018/0145844 A1 | 5/2018 | Pera et al. |
| 2018/0211656 A1 | 7/2018 | Chong et al. |
| 2018/0228006 A1 | 8/2018 | Baker et al. |
| 2018/0302235 A1 | 10/2018 | Cregg et al. |
| 2018/0375308 A1 | 12/2018 | Rohmer |
| 2019/0027875 A1 | 1/2019 | Parks |
| 2019/0124752 A1 | 4/2019 | Kelly |
| 2019/0130707 A1 | 5/2019 | Gruber |
| 2019/0228923 A1 | 7/2019 | Li |
| 2020/0037422 A1 | 1/2020 | Shivell |
| 2020/0170139 A1 | 5/2020 | Horning |
| 2021/0028954 A1 | 1/2021 | Ard et al. |

FOREIGN PATENT DOCUMENTS

| | | |
|---|---|---|
| EP | 0950935 B1 | 1/2002 |
| WO | 2012093412 A1 | 7/2012 |
| WO | 2012094722 A1 | 7/2012 |
| WO | 2015184193 A1 | 12/2015 |
| WO | 2018148315 A1 | 8/2018 |
| WO | 2019084391 A1 | 5/2019 |
| WO | 2021133467 A1 | 7/2021 |

OTHER PUBLICATIONS

International Search Report and Written Opinion for the International Patent Application No. PCT/US21/71739, dated Jan. 27, 2022, 16 pages.

International Search Report and Written Opinion for the International Patent Application No. PCT/US2018/059333, dated Jan. 18, 2019, 17 pages.

Petchel, Megan., "iDevices and Hubbell Incorporated Debut First Co-Developed Technology Products at the 2018 Consumer Electronics Show (CES)" iDevices Blog, Jan. 9, 2018.

Ecobee is building Alexa into its theromstats and light switches, https://techcrunch.com/2017/05/03/ecobee-is-building-alexa-into-its-thermostats-and-light-switches/.

"ecobee_Switch+_ecobee_Smart_Home_Technology2-website_ecobee, https://www.ecobee.com/switch-plus/, downloaded on May 23, 2018".

U.S. Appl. No. 62/455,973 Specification, Claims, Abstract, Drawings with Filing Receipt, filed Feb. 7, 2017, 42 pages.

International Search Report and Written Opinion for the International Patent Application No. PCT/US2020/058642, dated Mar. 26, 2021, 14 pages.

International Search Report and Written Opinion for the International Patent Application No. PCT/US2020/036765, dated Aug. 28, 2020, 14 pages.

Author Unknown., "Seco-Larm SD-7202GC-PEQ Enforcer LED Illuminated RTE Single-gang Wall Plate with Large Green Button, Large Illuminated Push Button with Caption "Push To Exit", Pushbutton Rated 10A at 125 to 250VAC" Seco-Larm®—retrieved May 7, 2019—URL: https://www.amazon.com/Seco-Larm-SD-7202GC-PEQ-Illuminated-Single-gang-Pushbutton/dp/B0051BUGCA/ref=sr_1_1?crid=3DJETQGDS3II8&keywords=seco-larm%2Bsd-7202gc-peq&qid=1653064565&sprefix=-larm%2BSD-7%2Caps%2C98&sr=8-1&th=1.

(56) References Cited

OTHER PUBLICATIONS

International Search Report and Written Opinion for the International Application No. PCT/US23/13599, dated Jun. 16, 2023, 18 pages.

* cited by examiner

ANYWHERE WIRELESS SWITCH AND/OR DIMMER

FIELD OF THE DISCLOSURE

The present disclosure relates generally to electrical devices, and more particularly to a wireless electrical device such as, for example, a wireless switch, a wireless dimmer, etc. arranged and configured to enable simplified access to the batteries positioned within the wireless switch.

BACKGROUND OF THE DISCLOSURE

Generally speaking, wireless electrical devices such as, for example, a wireless switch, a wireless dimmer, etc. (terms used interchangeably herein without the intent to limit) are well known in the industry. Wireless switches may include a housing for enclosing electrical circuitry including, for example, a microprocessor or a controller for powering, controlling, and operating the wireless switch, an actuator accessible by a user for controlling an associated electrical load such as, for example, an actuator for turning a lighting load ON, OFF, DIM UP, DIM DOWN, etc., a transceiver for transmitting and/or receiving wireless signals, and a power source such as, for example, one or more batteries.

In use, the wireless switch may be communicatively coupled to another switch such as, for example, in a 3-way switch arrangement, where the other switch may be hard-wired to an associated electrical load (e.g., a light, a motor, a fan). Alternatively, for example, the wireless switch may be arranged and configured to wirelessly communicate with the associated electrical load directly or may be arranged and configured to communicate with an APP running on an external computing system.

Moreover, in use, the wireless switch may be mounted to an existing wall-box such as, for example, a single gang wall-box or multi-gang wall-box, or surface mounted directly to a wall or surface.

Regardless of the form or configuration, wireless switches face challenges that need to be overcome. One common problem associated with current wireless switches relates to servicing of the batteries located within the wireless switch. During the lifetime of a wireless switch, the batteries may need replacing multiple times.

Thus, it would be beneficial to incorporate a mechanism that allows simplified access to the batteries within a wireless switch to facilitate replacement. In addition, it would be beneficial to provide a wireless switch that has a physical appearance identical to standard, non-wireless switches, when coupled to an electrical wall-box or surface mounted to a wall or surface utilizing a common wall-plate.

It is with respect to these and other considerations that the present improvements may be useful.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

Disclosed herein is a battery-powered wireless electrical device such as, for example, a wireless switch or wireless dimmer. The battery powered wireless switch being arranged and configured to be mounted to a wall-box or to a surface of a building. The wireless switch comprising a base including a front surface and a frame disposed on the front surface, the frame including an aperture, a printed circuit board ("PCB") configured to be coupled to a replaceable battery, and a user-accessible actuator mounted at least partially within the aperture, wherein a portion of the wireless switch can be transitioned from a first closed position to a second opened position, the second opened position providing the user access to the battery whether or not the wireless switch is mounted to the wall-box or the surface of the wall.

In one embodiment, the portion of the wireless switch that is transitioned between the first and second positions comprises the frame, the frame being moveably coupled to the base such that the frame pivots from the first closed position to the second opened position.

In one embodiment, the base and the frame each include a plurality of interconnecting projections and recesses arranged and configured to receive a longitudinal rod therein so that the frame is hingeably coupled to the base.

In one embodiment, the base includes a longitudinal side and a lateral side, the projections and recesses being arranged and configured along the longitudinal side of the base.

In one embodiment, one of the base or frame includes one or more snaps and the other one of the base or frame includes complementary recesses, arranged and configured to selectively secure the frame in the first closed position.

In one embodiment, the wireless switch further comprises a battery holder disposed at least partially within the base, the battery holder arranged and configured to receive the replaceable battery.

In one embodiment, the user-accessible actuator is arranged and configured to flex upon contact by an end-user, the user-accessible actuator flexing to contact one or more micro-switches positioned on the PCB.

In one embodiment, the user-accessible actuator includes a first end, a second end, and a vertical center, the vertical center being fixedly coupled to the frame, the first and second ends being arranged and configured as an unsupported cantilever to flex upon contact by the end-user.

In one embodiment, the base is coupled to a wall-box or a building surface, the base also being arranged and configured to couple to a wall-plate.

In one embodiment, the portion of the wireless switch that is transitioned between the first and second positions comprises a battery tray configured to be slideably received within a complementary battery tray opening of the wireless switch, the battery tray including a holder for receiving the battery therein, the battery tray and battery tray opening being arranged and configured to allow the battery tray to move from the first closed position to the second opened position whether or not the wireless switch is mounted to the wall-box or the surface of the wall.

In one embodiment, the battery tray opening is disposed at least partially within the frame the battery tray opening including a track for slideably receiving the battery tray.

In one embodiment, the frame is slideably coupled to the base so that the frame, and the user-accessible actuator mounted therein, are slideably movable from the first closed position to the second opened position.

In one embodiment, the base includes a track for slideably receiving the frame.

In one embodiment, a wireless switch arranged and configured to be mounted to a wall-box or to a surface of a wall is disclosed. The wireless switch comprising a base including a front surface and a printed circuit board ("PCB")

disposed at least partially within the base, the PCB including a replaceable battery, wherein a portion of the wireless switch can be transitioned from a first closed position to a second opened position, the second opened position providing the user access to the battery whether or not the wireless switch is mounted to the wall-box or the surface of the wall.

In one embodiment, the portion of the wireless switch transitioned from a first closed position to a second opened position comprises a frame coupled to the front surface of the base, the frame including an aperture arranged and configured to provide access to a user-accessible actuator mounted at least partially within the aperture; the frame being moveably coupled to the base so that the frame is arranged and configured to pivot from the first closed position to the second opened position to provide access to the battery.

In one embodiment, the base and the frame each include a plurality of interconnecting projections and recesses arranged and configured to receive a longitudinal rod therein so that the frame is hingeably coupled to the base.

In one embodiment, the base and frame include one or more snaps and the other one of the base or frame includes complementary recesses arranged and configured to selectively secure the frame in the first closed position.

In one embodiment, the wireless switch further comprises a battery holder disposed at least partially within the base, the battery holder arranged and configured to receive the replaceable battery.

In one embodiment, the portion of the wireless switch transitioned from a first closed position to a second opened position comprises a battery tray configured to be slideably received within a complementary battery tray opening of the wireless switch, the battery tray including a holder for receiving the battery therein, the battery tray and battery tray opening being arranged and configured to allow the battery tray to move from the first closed position to the second opened position whether or not the wireless switch is mounted to the wall-box or the surface of the wall.

In one embodiment, the portion of the wireless switch transitioned from a first closed position to a second opened position comprises a frame slideably coupled to the base so that the frame is slideably movable from the first closed position to the second opened position.

In one embodiment, a method for replacing a battery in a wireless switch mounted to a wall-box or to a surface of a wall is disclosed. The method comprising removing a wall-plate from the wireless switch, moving at least a portion of the wireless switch from a first closed position to a second opened position to provide access to the battery, removing and replacing the battery, moving at least a portion of the wireless switch from the second opened position to the first closed position, and re-attaching the wall-plate to the wireless switch.

In one embodiment, moving at least a portion of the wireless switch from a first closed position to a second opened position comprises pivoting a frame of the wireless switch from the first closed position to the second opened position.

In one embodiment, moving at least a portion of the wireless switch from a first closed position to a second opened position comprises sliding a battery tray from the first closed position to the second opened position.

In one embodiment, moving at least a portion of the wireless switch from a first closed position to a second opened position comprises sliding a frame of the wireless switch from the first closed position to the second opened position.

BRIEF DESCRIPTION OF THE DRAWINGS

By way of example, a specific embodiment of the disclosed device will now be described, with reference to the accompanying drawings, in which.

Figure 1:
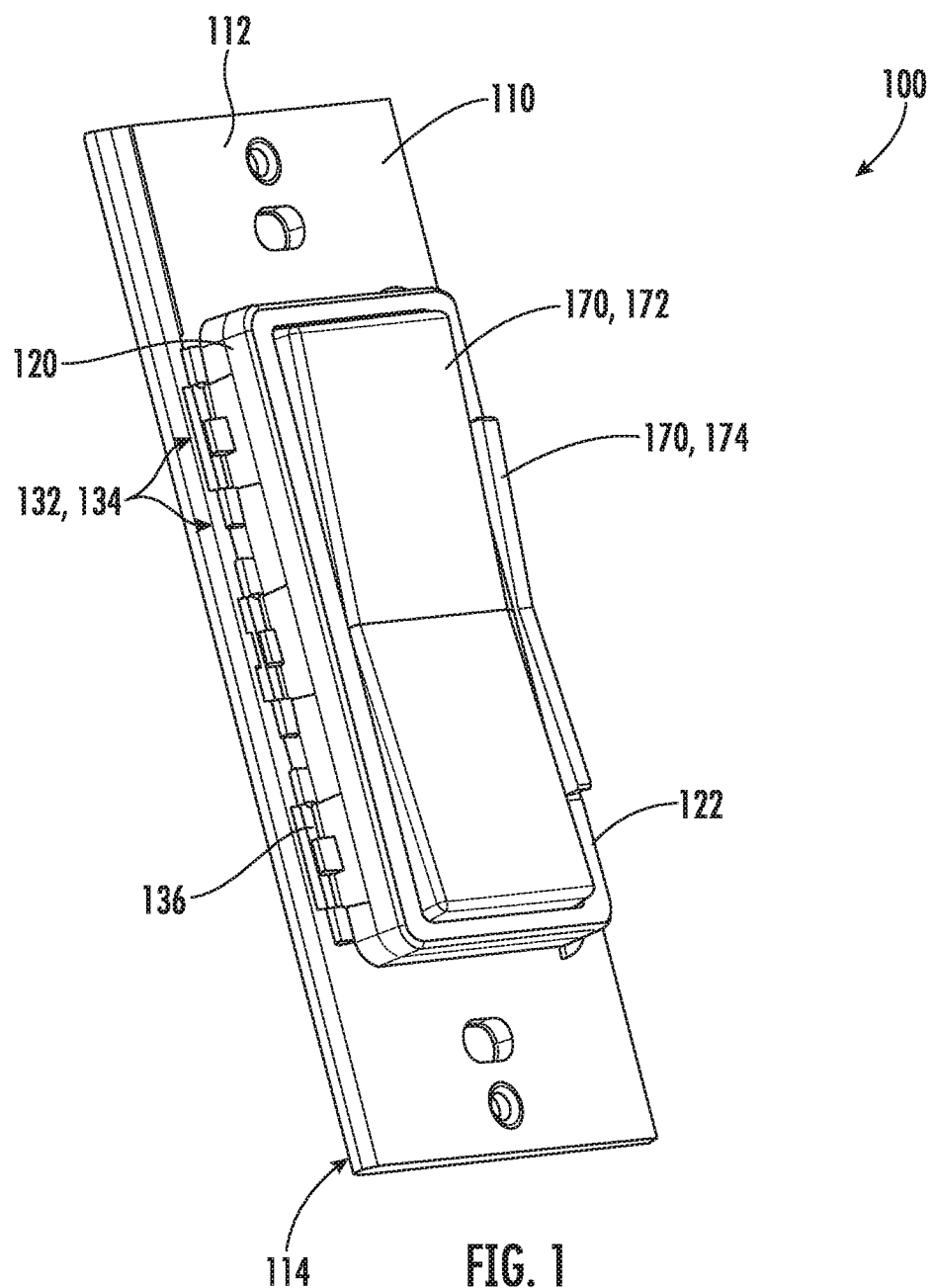
FIG. 1 is a front perspective view of an embodiment of an electrical device according to the present disclosure.
Figure 2:
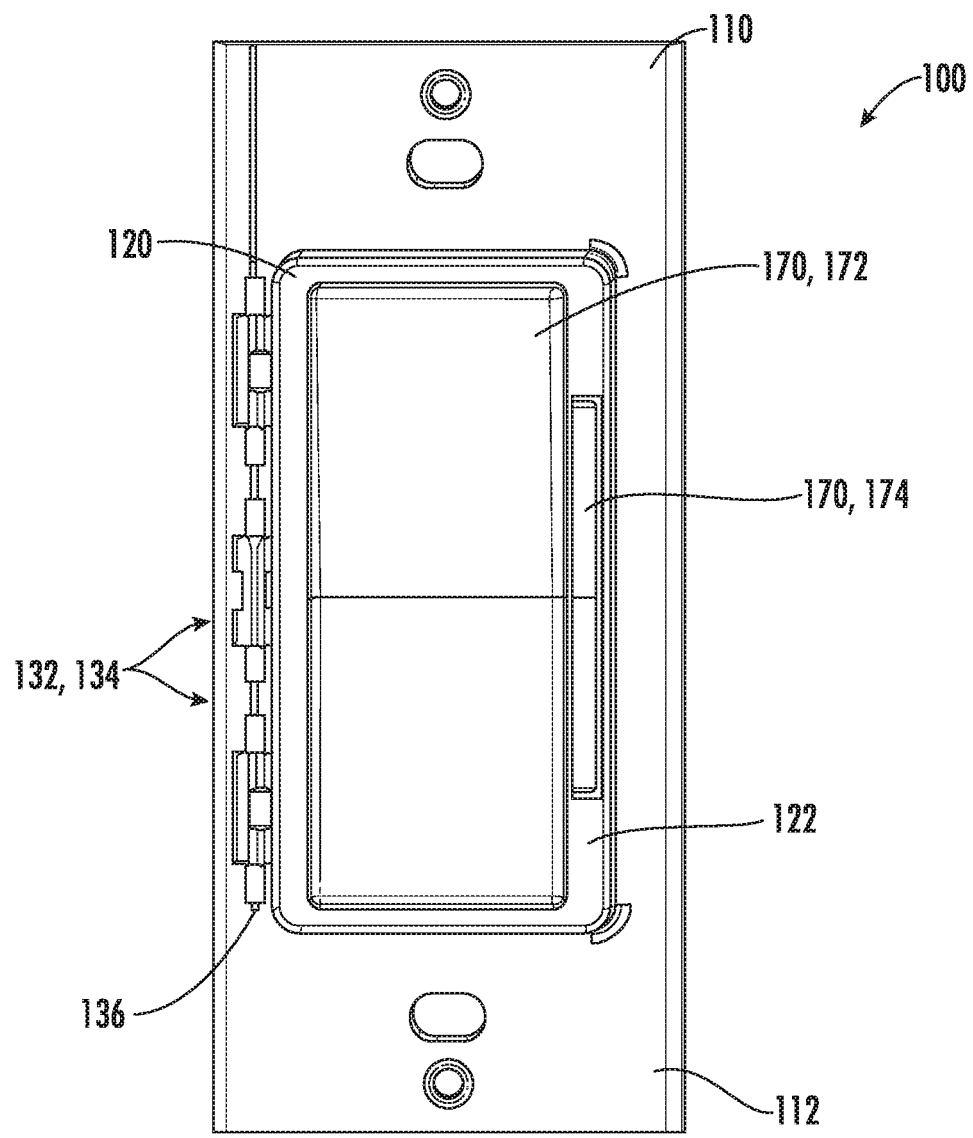
FIG. 2 is a front view of the electrical device shown in FIG. 1.

The drawings are not necessarily to scale. The drawings are merely representations, not intended to portray specific parameters of the disclosure. The drawings are intended to depict example embodiments of the disclosure, and therefore are not to be considered as limiting in scope. In the drawings, like numbering represents like elements.

DETAILED DESCRIPTION

Numerous embodiments of battery powered, wireless electrical devices such as, for example, wireless switches, wireless dimmers, wireless controllers, etc. (collectively referred to herein as a wireless switch) will now be described more fully hereinafter with reference to the accompanying drawings, in which preferred embodiments of the present disclosure are presented. In accordance with one or more features of the present disclosure, the wireless switches include one or more mechanisms or systems arranged and configured to provide access for servicing (e.g., replacing) the batteries located within the wireless switch. The mechanisms or systems may, however, be embodied in many different forms and should not be construed as being limited to the embodiments set forth herein. Rather, these embodiments are provided so that this disclosure will convey certain example features of mechanisms or systems for enabling simplified access to the batteries to those skilled in the art.

As will be described in greater detail below, in various embodiments, a wireless switch arranged and configured to control a load such as, for example, a lighting load, will be described. However, the load may be any load now known or hereafter developed, such as, for example, a lighting load, a motor, a fan, etc. In use, the wireless switch may be arranged and configured to turn the load ON and OFF. In addition, and/or alternatively, the wireless switch may be arranged and configured to DIM UP, DIM DOWN, change the speed, change the color, or change any suitable characteristic of the load. Features of the present disclosure may be used in combination with numerous different embodiments of battery-powered electrical switches. As such, the features of the present disclosure should not be limited to any particular type or configuration of battery-powered switch or associated load.

As will be described herein, the wireless switch may include a housing for holding, enclosing, or the like, electrical circuitry including a microprocessor or a controller for powering, controlling, and operating the wireless switch, an actuator (e.g., a manual actuator, a rocker, a paddle, a button, etc.) accessible by a user for controlling the associated electrical load, a transceiver for transmitting and/or receiving wireless signals, and a power source such as, for example, one or more batteries.

As will be described in greater detail herein, in one embodiment, the housing may include a base and a frame In one embodiment, the base and/or frame form a cavity or volume for receiving a PCB and one or more batteries. In one or more embodiments described herein, the frame may be arranged and configured as a "split" frame wherein a front segment of the frame is movable relative to a rear segment of the frame that may be fixed to the base.

The actuator may be any now known or hereafter developed actuator. For example, the actuator could be an actuator, a rocker, a paddle, a button, etc. (terms used interchangeably herein without the intent to limit) moveable between a first position and a second position including, for example, a pushbutton actuator, a rocker actuator, a paddle actuator a tactile actuator, a rotary actuator, a slide actuator, a return-to-neutral switch (e.g., a return-to-neutral switch is a switch that utilizes a biasing force (e.g., a spring) to bias the switch or actuator back to its neutral position), etc.

In use, the wireless switch may be arranged and configured to be mounted to a wall-box such as, for example, a single gang wall-box or multi-gang wall-box. In addition, and/or alternatively, the wireless switch may be surface mounted directly to a wall or other surface. In use, the wireless switch may be communicatively coupled to any suitable device including, for example, another electrical switch such as, for example, in a 3-way electrical switch arrangement, where the other electrical switch may be hardwired to the associated electrical load. In addition, and/or alternatively, the wireless switch may be wirelessly coupled to the associated load, wirelessly coupled to an APP running on an external computing system, etc.

In accordance with one or more features of the present disclosure, the wireless switch incorporates one or more mechanisms or systems arranged and configured to provide simplified access to the batteries positioned within the wireless switch to thereby facilitate servicing (e.g., replacement) of the batteries. In one embodiment, the wireless switch is arranged and configured to provide access to the batteries without requiring removal of the wireless switch from the wall-box or the wall or other surface. For example, in one embodiment, the wireless switch is arranged and configured so that the batteries may be accessed by removing an associated wall-plate from the wireless switch and then reconfiguring the wireless switch from a first closed configuration or position to a second opened configuration or position to access the batteries (configuration and position being used interchangeably herein without the intent to limit). Alternatively, in an alternate embodiment, the wireless switch is arranged and configured so that the batteries may be accessed by reconfiguring the wireless switch from a first closed position to a second opened position to access the batteries with the wall-plate still coupled to the wireless switch. Thus arranged, in either scenario, removal of the wireless switch from the wall-box or surface of the wall is not required. Rather, the user may only need to remove the wall-plate, if at all, to reconfigure the wireless switch. Thus, in accordance with one or more features of the present disclosure, the present disclosure is directed towards systems, mechanism, and methods for facilitating simplified access to the batteries for servicing (i.e., removal and replacement). As such, while the systems, mechanisms, and methods for facilitating access to the batteries will be described and illustrated in connection with particular embodiments of wireless switches, it should be appreciated that the systems, mechanisms, and methods to facilitate access to the batteries may be used in connection with any wireless electrical device now known or hereafter developed. As such, while the present disclosure will be described in connection with particular embodiments, the present disclosure should not be limited to any particular type of wireless switch or device unless specifically claimed.

Figure 3:
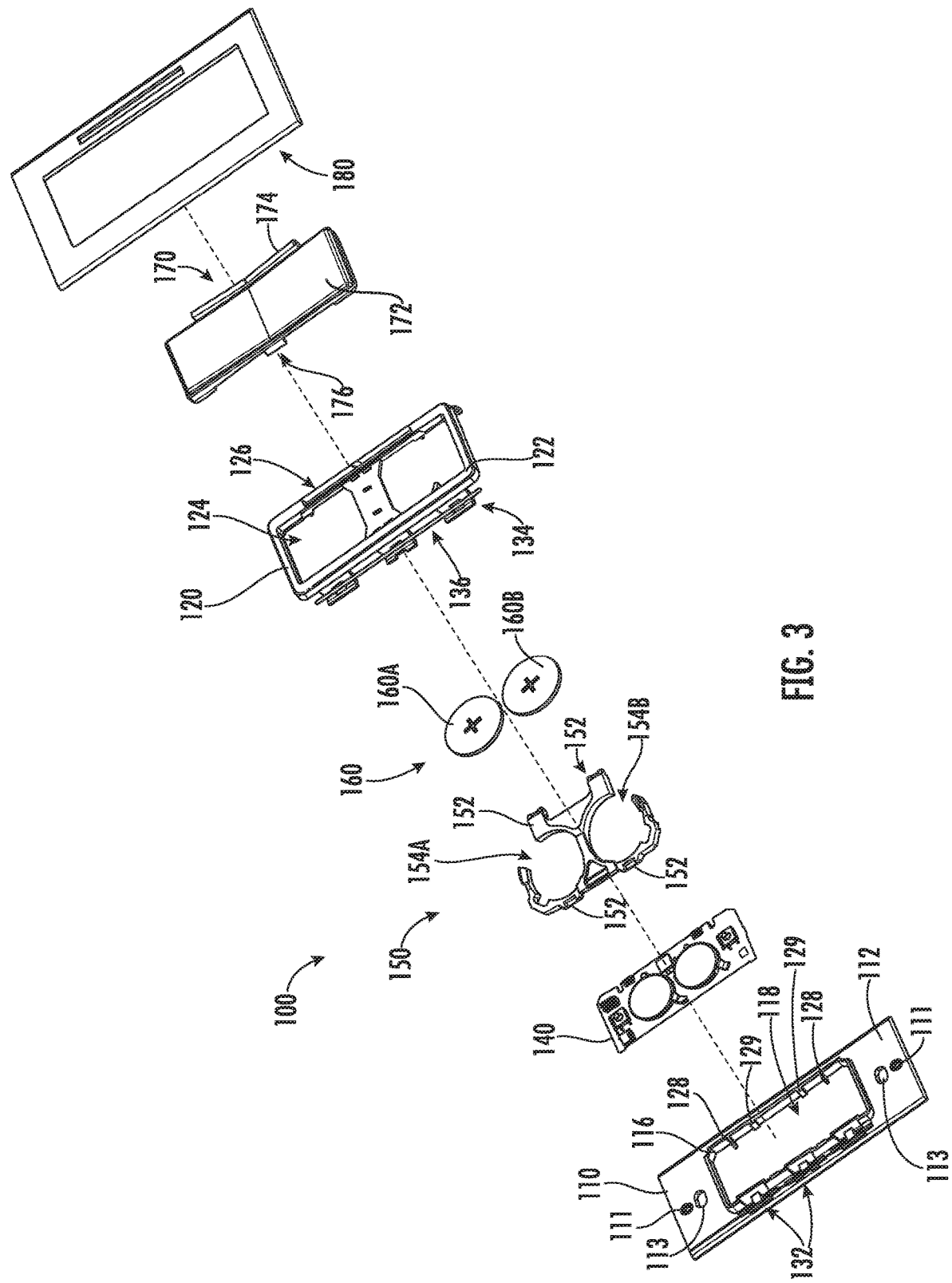
FIG. 3 is an exploded, perspective view of the electrical device shown in FIG. 1.
Figure 4:
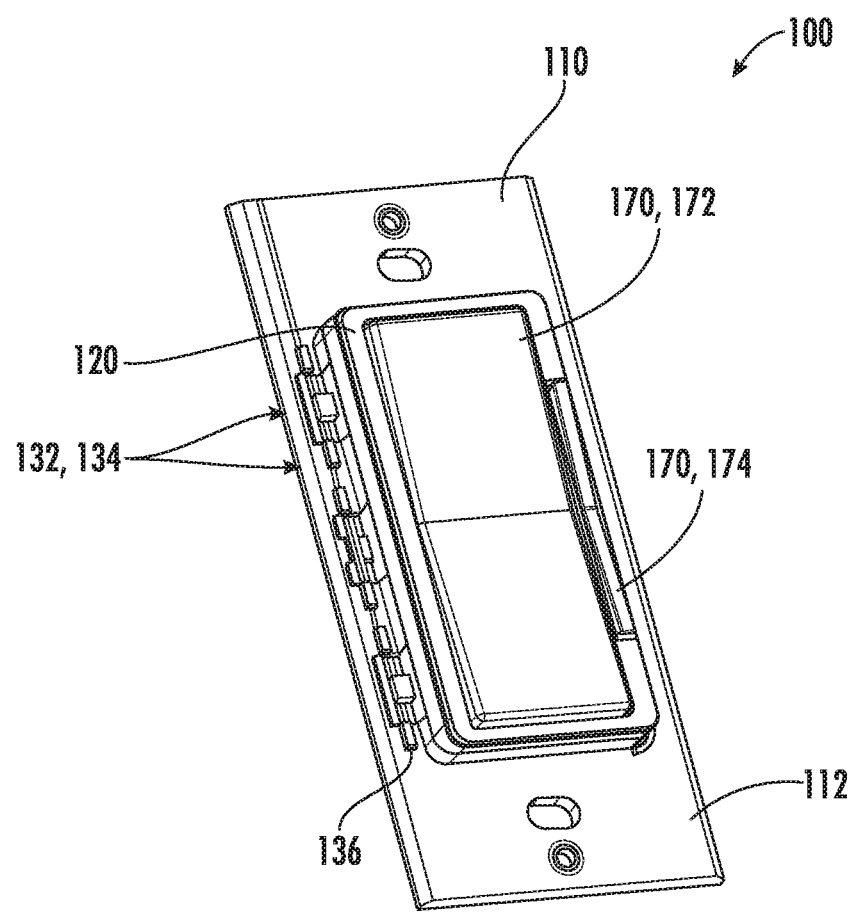
FIG. 4 is a front, perspective view of the electrical device shown in FIG. 1, the electrical device shown in a first closed position.
Figure 5:
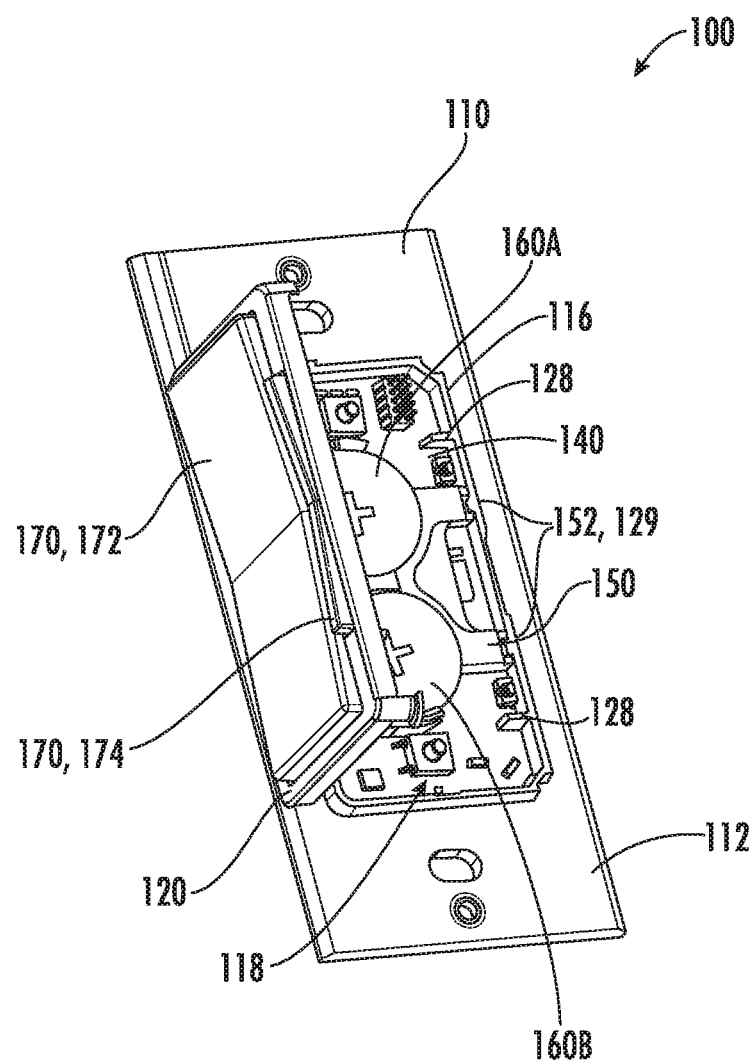
FIG. 5 is a front, perspective view of the electrical device shown in FIG. 1, the electrical device shown in a second opened position.

Referring to FIGS. 1-5, an exemplary wireless switch 100 according to the present disclosure is shown. In use, as will be described in greater detail herein, the wireless switch 100 includes a mechanism for transitioning a portion of the wireless switch 100 from a first closed position or configuration (FIGS. 1, 2, and 4) to a second opened position or configuration (FIG. 5). In the second opened configuration, as will be described in greater detail, the batteries positioned within the wireless switch 100 are rendered accessible through the front of the wireless switch 100 for servicing, replacing, or the like.

As illustrated, in one embodiment, the wireless switch 100 includes a base 110, a frame 120, a printed circuit board ("PCB") 140, a battery holder 150, batteries 160, and one or more actuators 170 such as, for example, a rocker 172 and an adjustment rocker (e.g., raise/lower, dim/bright, etc.) 174. In one embodiment (not shown), the wireless switch 100 may also include a plurality of LEDs to, for example, provide indication of lighting level, location, ON/OFF status, etc.

In one embodiment, the base 110 may include a front surface 112 and a rear surface 114. In use, as will be readily appreciated by one of ordinary skill in the art, the base 110 may be arranged and configured to couple to a wall-plate 180 (FIG. 3). For example, the base 110 may be include one or more holes 111 (FIG. 3) arranged and configured to receive one or more fasteners for coupling the wall-plate 180 to the base 110. In addition, the base 110 may be arranged and configured as a mounting plate for coupling the base 110, and hence the wireless switch 100, to a standard wall-box via, for example, fasteners. Alternatively, the base 110 may be arranged and configured to be surface mounted to a wall or surface (e.g., thus avoiding the need for a wall-box) via, for example, fasteners, adhesives, two-face tape, etc. For example, the base 110 may include one or more holes 113 (FIG. 3) arranged and configured to receive one or more fasteners for coupling the base 110 and hence the wireless switch 100 to a wall-box or wall.

In one embodiment, as illustrated, the base 110, and hence the wireless switch 100, is arranged and configured with minimal thickness so that, in use, when surface mounted or coupled to a wall-box, the wireless switch 100 may appear identical, or at least substantially similar (e.g., noticeably indifferent), to other similarly styled switches, when coupled to a standard wall-plate.

In one embodiment, the PCB 140 is positioned against the base 110. For example, as illustrated, in one embodiment, the base 110 may include a wall 116 extending from the front surface 112 of the base 110. The wall 116 may have a rectangular configuration, although other configurations are envisioned. In use, the wall 116 defines a cavity 118 arranged and configured to receive the PCB 140. The PCB 140 may be surrounded by the wall 116 for added protection. As will be described in greater detail below, the battery holder 150 may be coupled to the base 110, the PCB 140 may be held in place in between the battery holder 150 and the base 110. Alternatively, the PCB 140 may be coupled to the base 110. The PCB 140 may be coupled to the base 110 by any suitable mechanism now known or hereafter developed including, for example, fasteners, snap-fit connection, etc. Alternatively, in one embodiment, the PCB may be integrally formed with the device. For example, the PCB may be selectively printed onto the base 110, the frame 120, the actuator 170, etc.

As will be appreciated by one of ordinary skill in the art, the PCB 140 may include all needed circuitry for operation of the wireless switch 100 including, for example, one or more microprocessors or controllers for controlling operation of the wireless switch, micro-switches for receiving inputs via activation or movement of the actuators 170 (e.g., rocker 172 and/or adjustment rocker 174), and holders or receptacles for receiving a power source (e.g., batteries) 160. However, since general operation and configuration of wireless switches is well known in the art and not the subject of the present disclosure, additional information on the arrangement and configuration of the PCB and/or wireless switch is omitted for the sake of brevity of the present disclosure.

As illustrated, in one embodiment, the frame 120 may be coupled to the base 110. The frame 120 may be coupled to the base 110 via any mechanism now known or hereafter developed suitable for allowing the frame 120 to move (e.g., pivot, slide, rotate, etc.) from a first closed position or configuration (FIGS. 1, 2, and 4) to a second opened position or configuration (FIG. 5). In one embodiment, as illustrated, the frame 120 is hingeably coupled to the base 110. For example, as illustrated, in one embodiment, the base 110 includes a plurality of snaps, projections and recesses, or the like 132 arranged and configured to interconnect with a plurality of snaps, projections and recesses, or the like 134 formed on the frame 120. In use, the interconnected snaps 132, 134 may be arranged and configured to receive a longitudinal rod 136 so that, in use, the rod 136 couples the frame 120 to the base 110 while still enabling the frame 120 to move (e.g., pivot, hinge, etc.) relative to the base 110. In addition, and/or alternatively, in one embodiment, the base 110 may include one or more snaps 128 for engaging the frame 120 when in the first closed position (FIG. 4) to thereby prevent the frame 120 from accidentally opening.

As illustrated, the frame 120 includes a front surface 122 and includes an opening 124 such as, for example, a rectangular opening for enabling the rocker 172 to be accessible to a user. In addition, in the illustrated embodiment, the frame 120 may include a secondary opening 126 such as, for example, a rectangular opening for enabling the adjustment rocker 174 to be accessible to the user, although as previously mentioned the present disclosure is not so limited and the rocker and adjustment rocker may have other configurations or be completely omitted.

In use, the rocker 172 and the adjustment rocker 174 may be coupled to the frame 120 by any suitable mechanism now known or hereafter developed. For example, in one embodiment, the rocker 172 and/or adjustment rocker 174 may include a series of snaps, projections and recesses, or the like 176 (FIG. 3) arranged and configured to couple the rocker 172 and/or adjustment rocker 174 to the frame 120.

In accordance with one or more features of the present disclosure, the rocker 172 and/or the adjustment rocker 174 may be arranged and configured to flex. That is, in use, contrary to currently known rockers and adjustment rockers that pivot about a pivot point upon being contacted by a user, in one embodiment of the present disclosure, the rocker 172 and/or the adjustment rocker 174 are arranged and configured to flex, although it is envisioned that the rocker and/or adjustment rocker may be arranged and configured to pivot. By arranging the rocker 172 and/or the adjustment rocker 174 to flex instead of pivot, the rocker 172 and/or the adjustment rocker 174 are arranged and configured to return to their neutral position without the need for a separate or biasing feature thereby facilitating easier manufacturing. In use, one or more snaps, ledges, hooks, projections, or the like 176 (terms used interchangeably herein without the intent to limit) may be used to hold the rocker 172 and/or the adjustment rocker 174 in place while enabling the rocker 172 and/or the adjustment rocker 174 to flex and return to neutral. That is, in one embodiment, the rocker 172 and the adjustment rocker 174 may include one or more snaps 176 near the vertical centers thereof that engage corresponding openings or hook areas 190 formed in a cross beam 194 of the frame 120, which then acts as a rigid connection. Thereafter, the ends of the rocker 172 and/or the adjustment rocker 174 can be unsupported allowing the ends to act as cantilevered beams and flex under the influence of the user. Thus arranged, in use, the actuators 170 (e.g., rocker 172 and/or the adjustment rocker 174) are designed and configured to flex in order to move a sufficient distance to contact the PCB.

Figure 8:
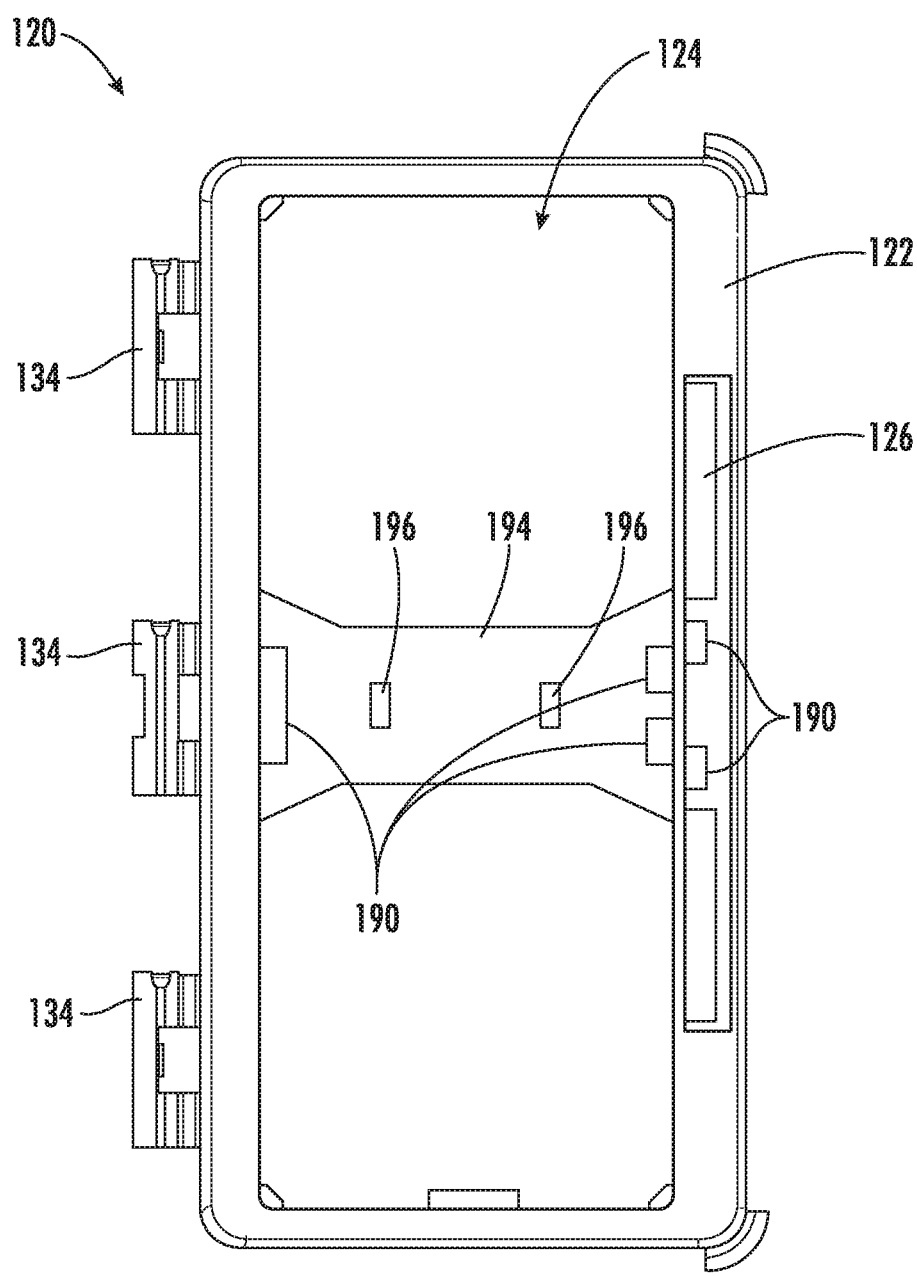
FIGS. 8-11 illustrate various views of an embodiment of an actuator that may be used in connection with one or more of the electrical devices disclosed herein in accordance with one or more aspects of the present disclosure.
Figure 9:
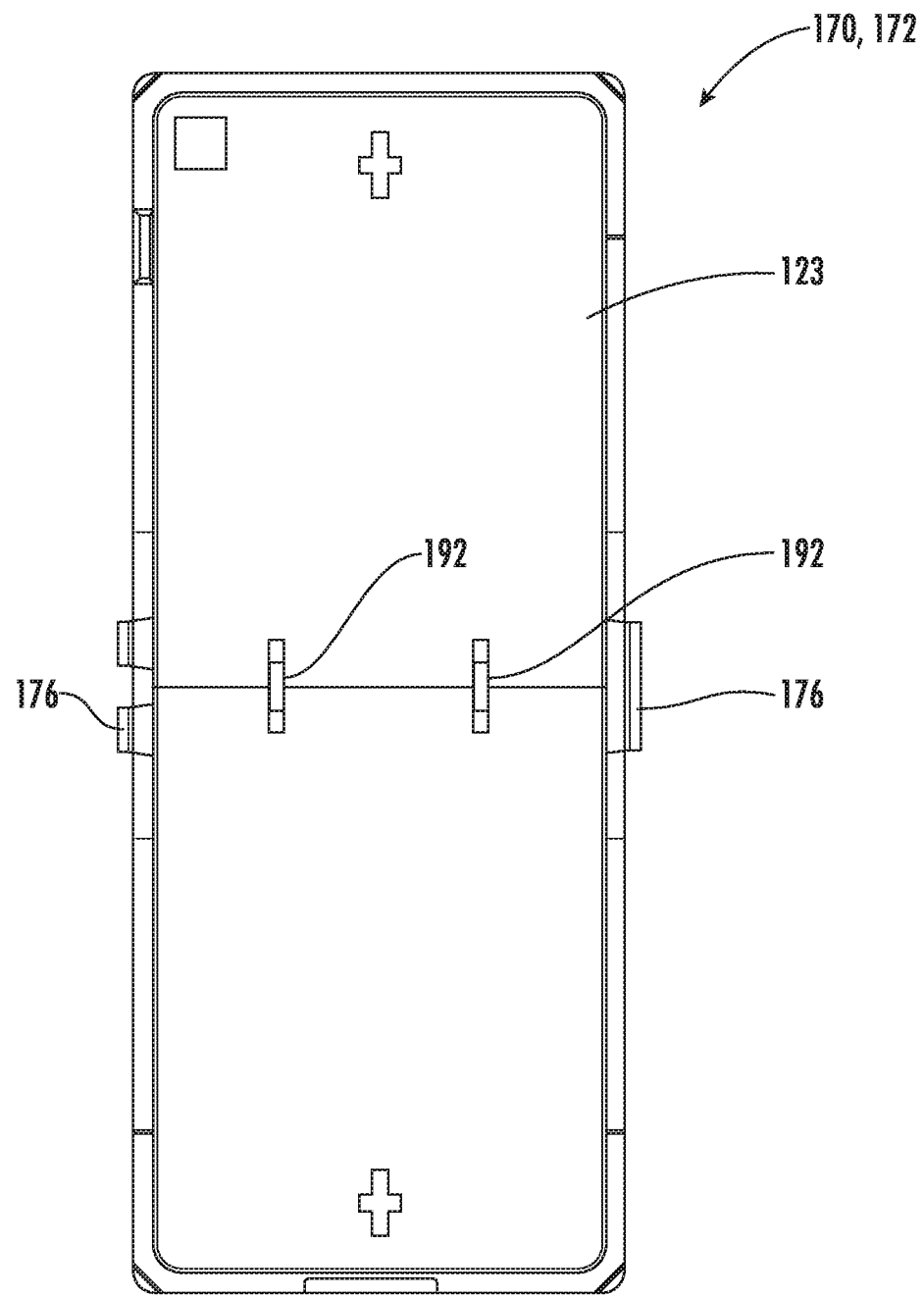
Figure 10:
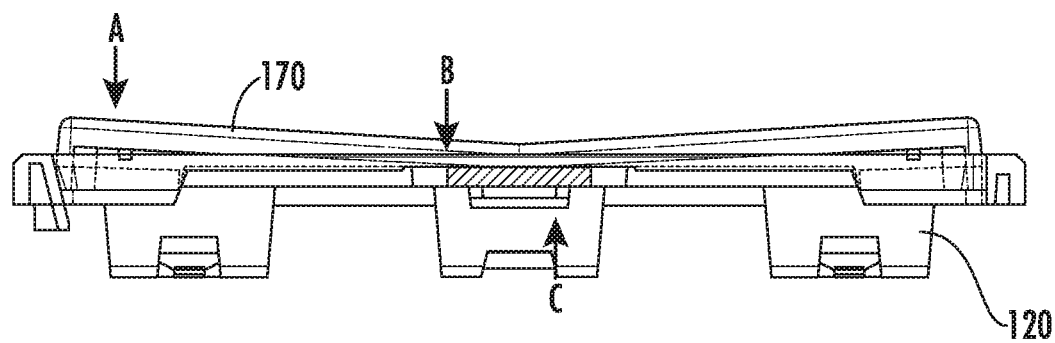

For example, referring to FIGS. 8-10, the frame 120 may include openings or hook areas 190 formed therein for each actuator 170 (e.g., rocker 172 and adjustment rocker 174). Meanwhile, the actuators 170 include one or more snaps 176 formed along an edge thereof and one or more snaps 192 extending from a rear surface 123 thereof more centrally located (FIG. 9 illustrating rocker 172). In use, the snaps 176 are arranged and configured to couple, interact with, etc. the openings or hook areas 190 formed in the cross beam 194 of the frame 120, while the snaps 192 are arranged and configured to couple, interact with, etc. openings 196 formed in the cross-beam 194 formed on the frame 120. Interaction of the snaps 176, 192 with the openings 190, 196 formed in the cross-beam 194 ensure that the actuators 170 can only be attached to the frame 120 when properly aligned. In addition, the snaps 176, 192 hold the actuator 170 securely to the cross bar 194 formed on the frame 120.

Thus arranged, referring to FIG. 10, when an end-user presses down on either end of the actuator 17, the pivoting action removes any slop in the snaps as the actuator 170 attempts to rotate about the edge of the cross beam 194 closest to the end that the user is pressing on. That is, in use, the actuators 170 are prevented from moving a sufficient distance to contact the PCB without flexing. As such, in order to contact the PCB, the actuators 170 are designed and configured to flex in order to move a sufficient distance to contact the PCB.

In one embodiment, the openings 190, 196 and the snaps 176, 192 are arranged and configured to hold the actuator 170 to the cross bar 194 snugly, minimizing any slop between the openings 190, 196 and the snaps 176, 192 when engaged. This provides a precision fit resulting in a better feel to the user when in use and a more aesthetically pleasing finished product. Also, slop is minimized to preclude the actuator 170 from contacting elements of the PCB, e.g., microswitches, unless the user presses down on an end of the actuator 170 with sufficient force to cause the actuator 170 to be deflected a predetermined distance to make sufficient contact with an element of the PCB, e.g., contact a microswitch and move through a throw distance to activate the microswitch.

For example, as generally illustrated in FIG. 10, when a user presses on the actuator 170 at A, the actuator 170 naturally seeks to pivot at B, however due to the connection between the snaps 176, 192 and the openings 190, 196 at C, a rigid connection is created that prevents the actuator 170 from pivoting (e.g., any slop is absorbed by the contact points at B and C as the actuator is pressed at A, thus B and C act as rigid connections, which transforms the actuator 170 into a cantilevered beam). As such, in use, the end of the snaps adjacent C prevents, or at least minimizes any see-saw effect.

Figure 11:
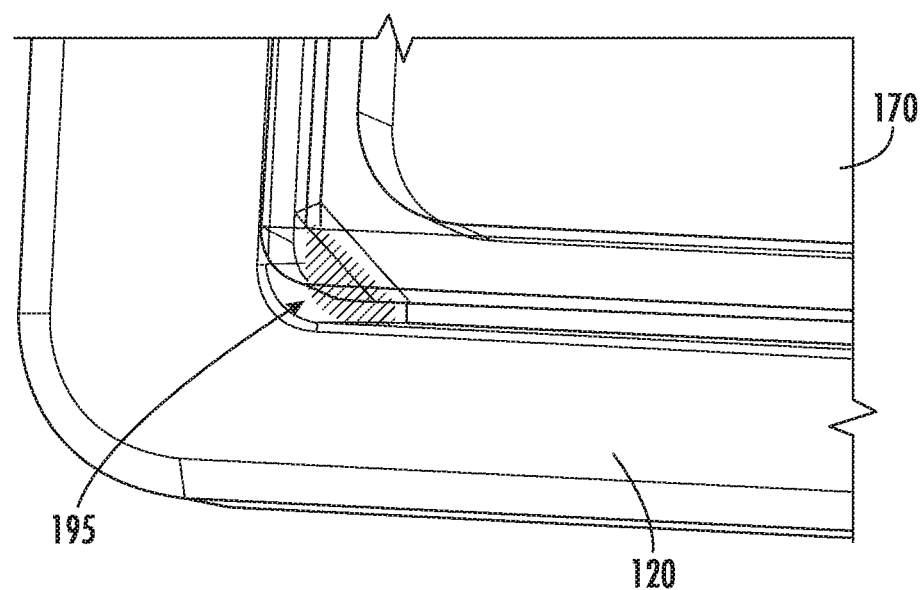

In addition, and/or alternatively, in accordance with one or more features of the present disclosure, the wireless switch 100 may include one or more stops 195 in the frame 120 to ensure that the user cannot over-flex the actuator 170. For example, as illustrated in FIG. 11, one or more stops 195 may be formed in the corners of the openings 124, 126.

Figure 6:
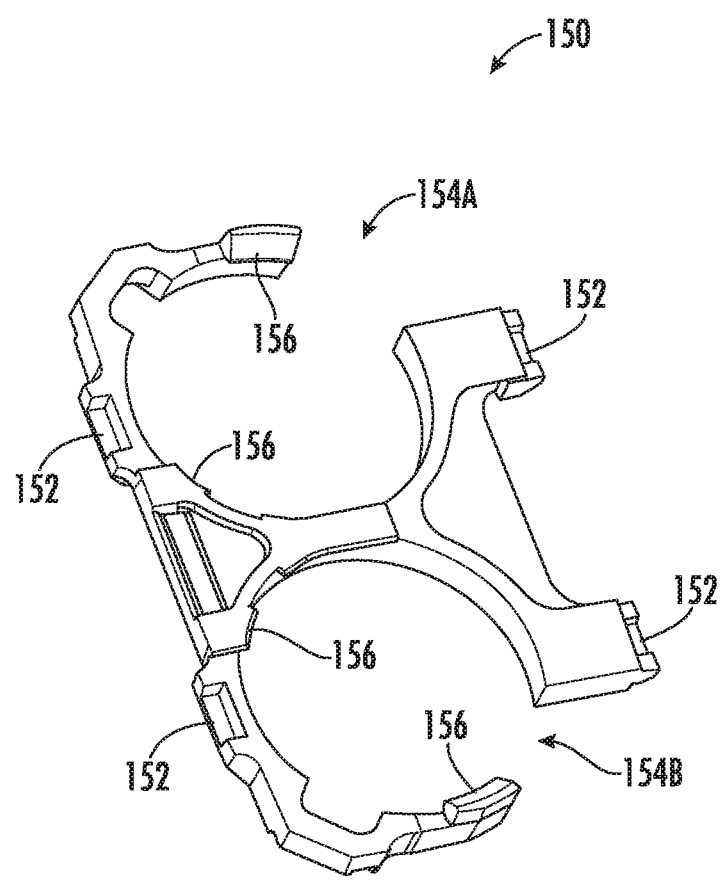
FIG. 6 is a front, perspective view of an embodiment of a battery holder that may be used in the electrical device shown in FIG. 1.

In addition, as illustrated in (FIGS. 3, 5, and 6), the battery holder 150 may be arranged and configured to couple to the base 110. In use, the battery holder 150 may be coupled to the base 110 by any suitable mechanism now known or hereafter developed. For example, as illustrated, the battery holder 150 may include a series of snaps, projections and recesses, or the like 152 arranged and configured to couple with the base 110. In one embodiment, the base 110 may include a plurality of snaps 129 for engaging the snaps 152 formed on the battery holder 150. In one embodiment, the battery holder 150 may be coupled to the base 110 on both sides thereof, although such is not necessary and other arrangements are envisioned.

Figure 7:
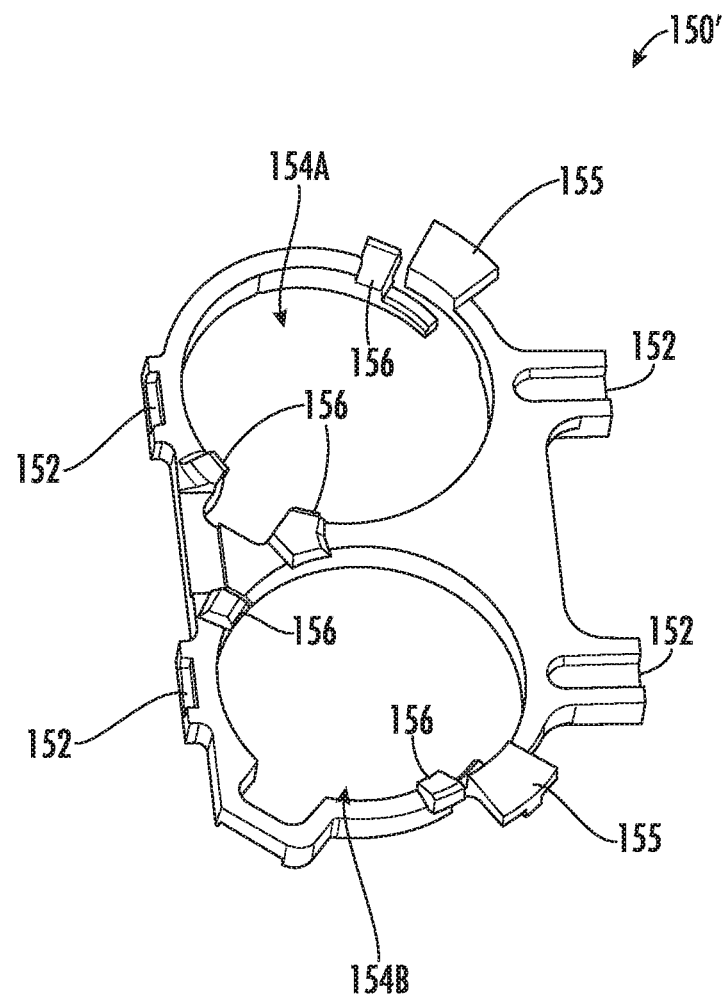
FIG. 7 is a front, perspective view of an alternate embodiment of a battery holder that may be used in the electrical device shown in FIG. 1.

As illustrated, the battery holder 150 may include first and second holders 154A, 154B for receiving first and second batteries 160A, 160B, respectively. For example, in one embodiment, the battery holder 150 may include first and second circular or semi-circular holders 154A, 154B for receiving first and second coin-shaped batteries 160A, 160B, although other numbers and configurations of batteries/ power supplies and corresponding holders are envisioned. In use, the battery holder 150 may include snaps 156 arranged and configured to securely hold the batteries 160 within the holders 154, and thus into contact with corresponding holders or receptacles formed in the PCB 140 when assembled. Alternatively, referring to FIG. 7, an alternate embodiment of a battery holder 150' is shown. In use, the battery holder 150' is substantially similar to the battery holder 150 previously described. However, in addition, the battery holder 150' may be arranged and configured to include a mechanism 155 for automatically ejecting the batteries 160A, 160B positioned within the holders 154A, 154B when depressed. In use, activation of the mechanism 155 may cause the holders 154A, 154B to compress against the batteries 160A, 160B positioned therein, causing the batteries 160A, 160B to eject from the holder 154A, 154B.

Referring to FIGS. 4 and 5, in accordance with one or more features of the present disclosure, the frame 120, and hence the rocker 172 and the adjustment rocker 174, are hingeably coupled to the base 110 so that, in use, the frame 120, and hence the rocker 172 and the adjustment rocker 174, can be moved from a first closed position (FIG. 4) to a second opened position (FIG. 5) so that a user can access the batteries 160 within the wireless switch 100 to service, replace, or the like. Thus arranged, the batteries 160 are rendered easily accessible to the end user. For example, in use, upon determination that the batteries 160 need replacing, the end user can remove the wall-plate from the wireless switch 100 and move (e.g., pivot) the frame 120 from the first closed position (FIG. 4) to the second opened position (FIG. 5). This arrangement eliminates the need for the user to decouple the wireless switch 100 from the wall-box or remove the wireless switch 100 from the surface or wall, thereby simplifying replacement of the batteries 160.

As will be appreciated, while the frame 120, and hence the rocker 172 and the adjustment rocker 174, have been hingeably coupled to the base 110 along one side thereof, it is envisioned that the frame 120 may be arranged and configured to pivot along the opposite side thereof. Alternatively, the frame 120 may be hingeably coupled to the base 110 along a top or bottom side thereof (e.g., pivot about an axis extending laterally across the front surface of the wireless switch along either the top or bottom surface thereof).

Figure 12:
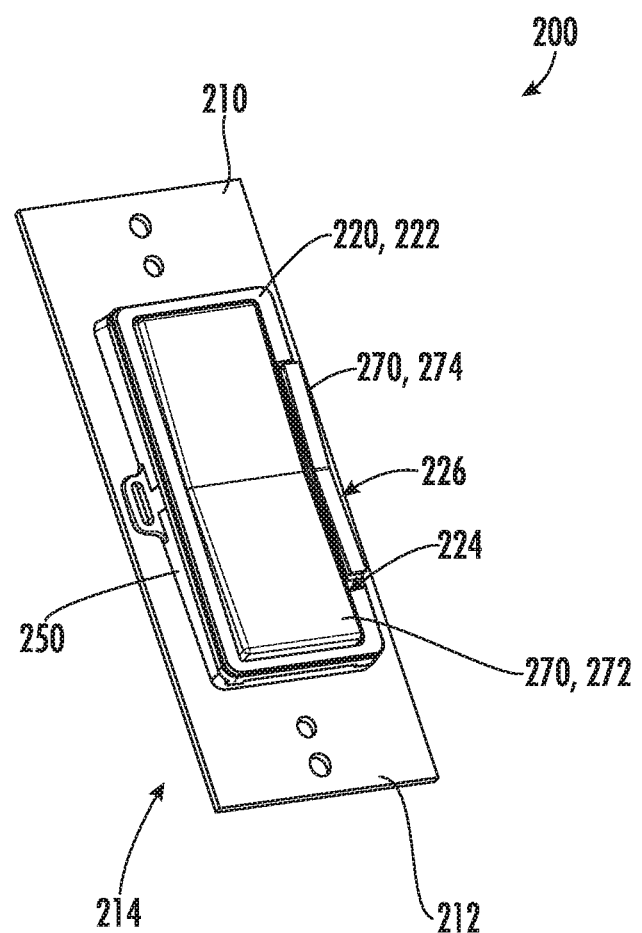
FIG. 12 is a front, perspective view of an alternate embodiment of an electrical device in accordance with the present disclosure, the electrical device shown in a first closed position.
Figure 13:
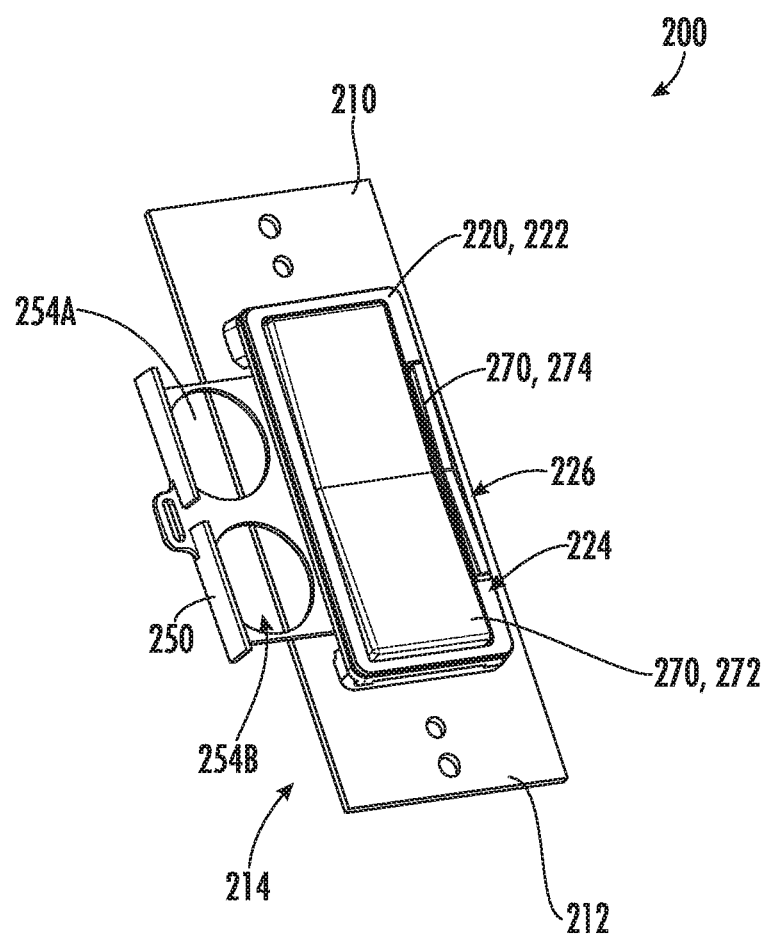
FIG. 13 is a front, perspective view of the electrical device shown in FIG. 12, the electrical device shown in a second opened position.

Referring to FIGS. 12 and 13, an alternate exemplary wireless switch 200 according to the present disclosure is shown. In use, the wireless switch 200 is substantially similar to the wireless switch 100 previously described except as provided for herein. Thus, for the sake of brevity, description of identical components is omitted herefrom. In use, as will be described in greater detail herein, the wireless switch 200 includes a battery tray 250, the battery tray 250 being slideably received within the wireless switch 200 so that the battery tray 250, and hence the batteries positioned therein, may be moved from a first closed position or configuration (FIG. 12) to a second opened position or configuration (FIG. 13). In the second opened configuration, as will be described in greater detail, the batteries positioned within the wireless switch 200 are rendered accessible through the front of the wireless switch 200 for servicing, replacing, or the like.

As illustrated, in one embodiment, the wireless switch 200 includes a base 210, a frame 220, a printed circuit board ("PCB") (not shown), a battery tray 250, batteries (not shown), and one or more actuators 270 such as, for example, a rocker 272 and an adjustment rocker 274.

In one embodiment, the base 210 may include a front surface 212 and a rear surface 214. In use, as will be readily appreciated by one of ordinary skill in the art, the base 210 may be arranged and configured to couple to a wall-plate (not shown) via, for example, fasteners. In addition, the base 210 may be arranged and configured as a mounting plate for coupling the base 210, and hence the wireless switch 200, to a standard wall-box via, for example, fasteners. Alternatively, the base 210 may be arranged and configured to be surface mounted to a wall or surface (e.g., thus avoiding the need for a wall-box) via, for example, fasteners, adhesives, two-face tape, etc. In one embodiment, as illustrated, the base 210, and hence the wireless switch 200, is arranged and configured with minimal thickness so that, in use, when surface mounted or coupled to a wall-box, the wireless switch 200 will appear identical, or at least substantially similar (i.e., not noticeably different), to other similarly styled switches, when coupled to a standard wall-plate.

As previously described, the PCB may be arranged and configured to be positioned against and/or coupled to the base 210. In use, the PCB may include all needed circuitry for operation of the wireless switch 200 including, for example, one or more microprocessors or controllers for controlling operation of the wireless switch 200, microswitches for receiving inputs via activation or movement of the actuators 270 (e.g., rocker 272 and/or adjustment rocker 274), and holders or receptacles for receiving a power source (e.g., one or more batteries).

As illustrated, the frame 220 includes a front surface 222 and an opening 224 such as, for example, a rectangular opening for enabling the rocker 272 to be accessible to a user. In addition, in the illustrated embodiment, the frame 220 may include a secondary opening 226 such as, for example, a rectangular opening for enabling the adjustment rocker 274 to be accessible to the user, although as previously mentioned the present disclosure is not so limited and the rocker and adjustment rocker may have other configurations or may be omitted.

In use, the rocker 272 and the adjustment rocker 274 may be coupled to the frame 220 by any suitable mechanism now known or hereafter developed. For example, in one embodiment, the rocker 272 and/or adjustment rocker 274 may include a series of snaps, projections and recesses, or the like arranged and configured to couple the rocker 272 and/or adjustment rocker 274 to the frame 220.

In accordance with one or more features of the present disclosure, and as previously described in greater detail, the rocker 272 and/or the adjustment rocker 274 may be arranged and configured to flex. That is, in use, contrary to currently known rockers and adjustment rockers that pivot about a pivot point upon being contacted by a user, in one embodiment of the present disclosure, the rocker 272 and/or the adjustment rocker 274 are arranged and configured to flex, although it is envisioned that the rocker and/or adjustment rocker may be arranged and configured to pivot. By arranging the rocker 272 and/or the adjustment rocker 274 to flex instead of pivot, the rocker 272 and/or the adjustment rocker 274 are arranged and configured to return to their neutral position without the need for a separate or biasing feature thereby facilitating easier manufacturing. In use, one or more snaps, projections, or the like may be used to hold the rocker 272 and/or the adjustment rocker 274 in place while enabling the rocker 272 and/or the adjustment rocker 274 to flex and return to neutral.

Referring to FIGS. 12 and 13, in accordance with one or more features of the present disclosure, the battery tray 250 may be slideably received within the frame 220 of the wireless switch 200 so that the battery tray 250 can move (e.g., slide) from a first closed position or configuration (FIG. 12) to a second opened position or configuration (FIG. 13). In one embodiment, the frame 220 may include a track for slideably receiving the battery tray 250. Thus arranged, the battery tray 250, and hence the batteries positioned therein, can be moved from a first closed position (FIG. 12) to a second opened position (FIG. 13) so that a user can access the batteries within the wireless switch 200 to service, replace, or the like. Thus arranged, the batteries are rendered easily accessible to the end user. For example, in use, upon determination that the batteries need replacing, the end user can remove the wall-plate from the wireless switch 200 and move (e.g., slide) the battery tray 250 from the first closed position (FIG. 12) to the second opened position (FIG. 13). This arrangement eliminates the need for the user to decouple the wireless switch 200 from the wall-box or remove the wireless switch 200 from the surface or wall, thereby simplifying replacement of the batteries.

As illustrated, similar to battery holder 150, the battery tray 250 may include first and second holders 254A, 254B for receiving first and second batteries, respectively. For example, in one embodiment, the battery tray 250 may include first and second circular or semi-circular holders 254A, 254B for receiving first and second coin-shaped batteries, although other numbers and configurations of batteries/power supplies and corresponding holders are envisioned. In use, the battery tray 250 may include snaps arranged and configured to securely hold the batteries within the holders 254, and thus into contact with corresponding holders or receptacles formed in the PCB when assembled.

As will be appreciated, while the battery tray 250 has been shown and described as moving (e.g., sliding) in a lateral or transverse motion from a longitudinal side of the frame, it is envisioned that the battery tray 250 may be arranged and configured to move, slide, extend, etc. from the opposite side thereof. Alternatively, the battery tray 250 may be arranged and configured to move, slide, extend, etc. in a longitudinal motion from either a top or bottom surface of the device. Still further, the battery tray 250 or trays (i.e., there could be more than one battery tray, each sized and configured to hold one or more batteries) could be arranged and configured to pivot/rotate about a corner to allow the batter tray to swing out in a rotary fashion from either a long side or a short side; e.g., similar to a pocket knife. Of course, the batter tray 250 could employ any combination of translating/sliding and pivoting/rotating to an open position from a closed position.

Figure 14:
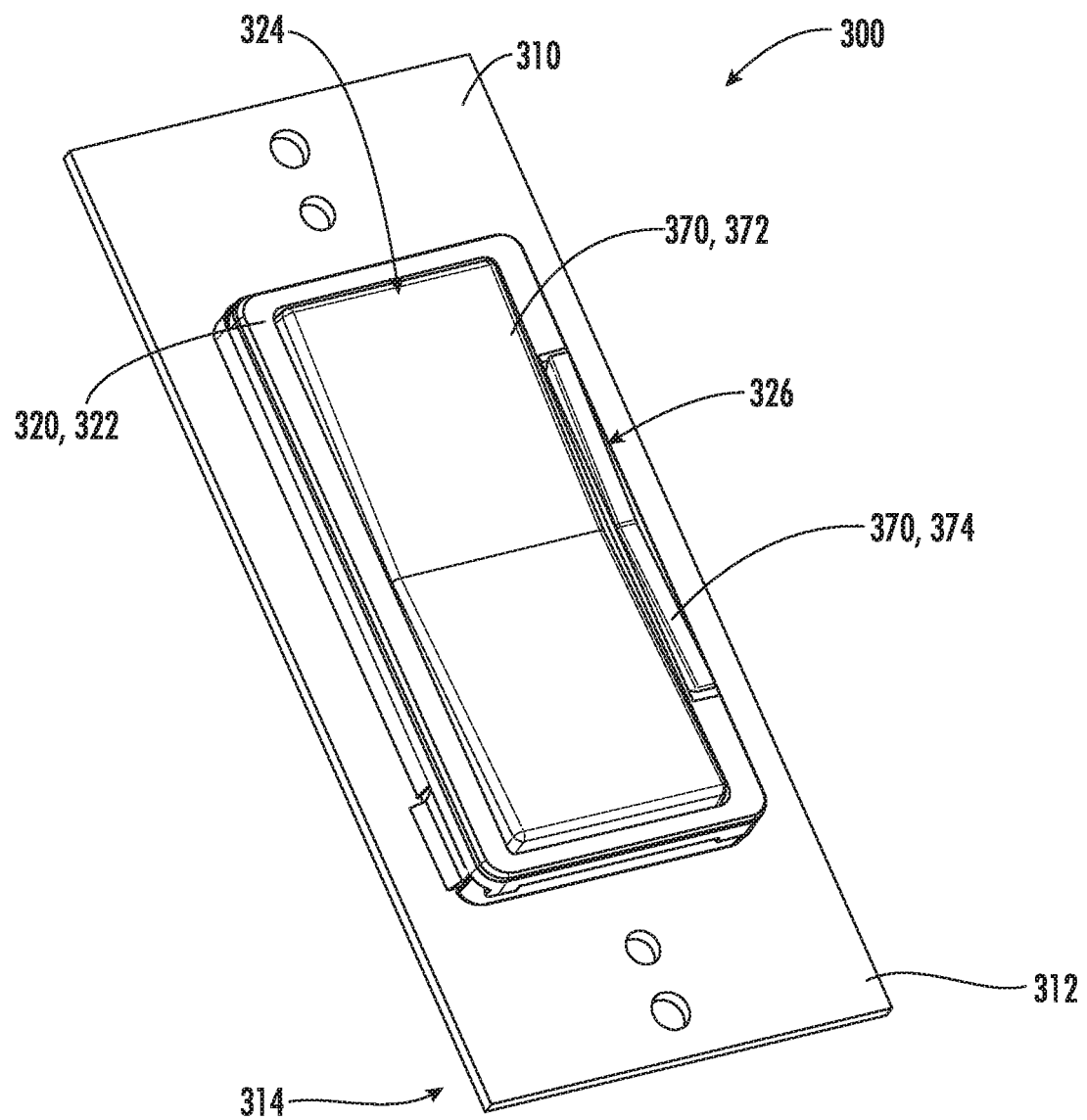
FIG. 14 is a front, perspective view of a further alternate embodiment of an electrical device in accordance with the present disclosure, the electrical device shown in a first closed position.
Figure 15:
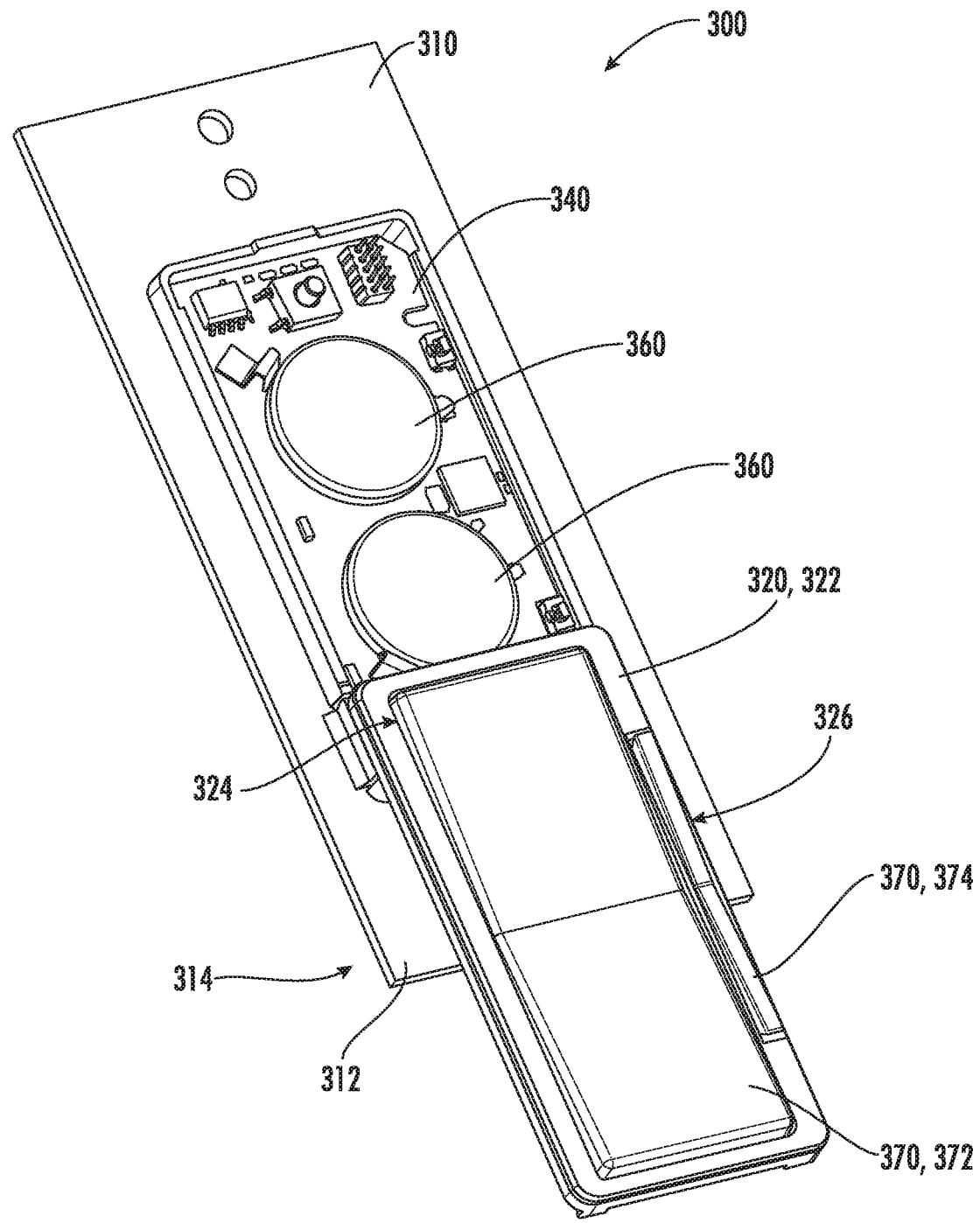
FIG. 15 is a front, perspective view of the electrical device shown in FIG. 14 the electrical device shown in a second opened position.

Referring to FIGS. 14 and 15, an alternate exemplary wireless switch 300 according to the present disclosure is shown. In use, the wireless switch 300 is substantially similar to the wireless switch 100 previously described except as provided for herein. Thus, for the sake of brevity, description of identical components is omitted herefrom. In use, as will be described in greater detail herein, the frame, and hence the one or more actuators coupled thereto, are slideably coupled to the wireless switch 300 so that the frame, and hence the one or more actuators coupled thereto, are moved from a first closed position or configuration (FIG. 14) to a second opened position or configuration (FIG. 15). In the second opened configuration, as will be described in greater detail, the batteries positioned within the wireless switch 300 are rendered accessible through the front of the wireless switch 300 for servicing, replacing, or the like.

As illustrated, in one embodiment, the wireless switch 300 includes a base 310, a frame 320, a printed circuit board ("PCB") 340, batteries 360, and one or more actuators 370 such as, for example, a rocker 372 and an adjustment rocker 374.

In one embodiment, the base 310 may include a front surface 312 and a rear surface 314. In use, as will be readily appreciated by one of ordinary skill in the art, the base 310 may be arranged and configured to couple to a wall-plate (not shown) via, for example, fasteners. In addition, the base 310 may be arranged and configured as a mounting plate for coupling the base 310, and hence the wireless switch 300, to a standard wall-box via, for example, fasteners. Alternatively, the base 310 may be arranged and configured to be surface mounted to a wall or surface (e.g., thus avoiding the need for a wall-box) via, for example, fasteners, adhesives, two-face tape, etc. In one embodiment, as illustrated, the base 310, and hence the wireless switch 300, is arranged and configured with minimal thickness so that, in use, when surface mounted or coupled to a wall-box, the wireless switch 300 will appear identical, or at least substantially similar (e.g., not noticeably different), to other similarly styled switches, when coupled to a standard wall-plate.

As previously described, the PCB 340 may be arranged and configured to positioned against and/or coupled to the base 310. In use, the PCB 340 may include all needed circuitry for operation of the wireless switch 300 including, for example, one or more microprocessors or controllers for controlling operation of the wireless switch, micro-switches for receiving inputs via activation or movement of the actuators 370 (e.g., rocker 372 and/or adjustment rocker 374), and holders or receptacles for receiving a power source (e.g., one or more batteries) 360.

As illustrated, the frame 320 includes a front surface 322 and an opening 324 such as, for example, a rectangular opening for enabling the rocker 372 to be accessible to a user. In addition, in the illustrated embodiment, the frame 320 may include a secondary opening 326 such as, for example, a rectangular opening for enabling the adjustment rocker 374 to be accessible to the user, although as previously mentioned the present disclosure is not so limited and the rocker and adjustment rocker may have other configurations or be completely omitted.

In use, the rocker 372 and the adjustment rocker 374 may be coupled to the frame 320 by any suitable mechanism now known or hereafter developed. For example, in one embodiment, the rocker 372 and/or adjustment rocker 374 may include a series of snaps, projections and recesses, or the like arranged and configured to couple the rocker 372 and/or adjustment rocker 374 to the frame 320.

In accordance with one or more features of the present disclosure, and as previously described in greater detail, the rocker 372 and/or the adjustment rocker 374 may be arranged and configured to flex. That is, in use, contrary to currently known rockers and adjustment rockers that pivot about a pivot point upon being contacted by a user, in one embodiment of the present disclosure, the rocker 372 and/or the adjustment rocker 374 are arranged and configured to flex, although it is envisioned that the rocker and/or adjustment rocker may be arranged and configured to pivot. By arranging the rocker 372 and/or the adjustment rocker 374 to flex instead of pivot, the rocker 372 and/or the adjustment rocker 374 are arranged and configured to return to their neutral position without the need for a separate or biasing feature thereby facilitating easier manufacturing. In use, one or more snaps, projections, or the like may be used to hold the rocker 372 and/or the adjustment rocker 374 in place while enabling the rocker 372 and/or the adjustment rocker 374 to flex and return to neutral.

Referring to FIGS. 14 and 15, in accordance with one or more features of the present disclosure, the frame 320, and hence the rocker 372 and the adjustment rocker 374 coupled thereto, may be slideably coupled to the base 310 of the wireless switch 30 so that the frame 320, the rocker 372, and the adjustment rocker 374 can move (e.g., slide) from a first closed position or configuration (FIG. 14) to a second opened position or configuration (FIG. 15). In one embodiment, the base 310 may include a track for slideably receiving the frame 320. Thus arranged, the frame 320 can move from a first closed position (FIG. 14) to a second opened position (FIG. 15) so that a user can access the batteries 360 within the wireless switch 300 to service, replace, or the like. Thus arranged, the batteries 360 are rendered easily accessible to the end user. For example, in use, upon determination that the batteries 360 need replacing, the end user can remove the wall-plate from the wireless switch 300 and move (e.g., slide) the frame 320 including the rocker 372 and the adjustment rocker 374 coupled thereto, from the first closed position (FIG. 14) to the second opened position (FIG. 15). This may eliminate the need for the user to decouple the wireless switch 300 from the wall-box or remove the wireless switch 300 from the surface or wall, thereby simplifying replacement of the batteries 360.

As will be appreciated, while the frame 320, and hence the rocker 372 and the adjustment rocker 374 coupled thereto, are shown and described as moving (e.g., sliding) in a longitudinal motion from a bottom side of the device, it is envisioned that the frame 320 may be arranged and configured to move, slide, extend, etc. from the opposite top side thereof. Alternatively, the frame 320 may be arranged and configured to move, slide, extend, etc. in a lateral motion from either a left or right side of the device (e.g., left to right translational movement). In addition, and/or alternatively, the frame 320 may be arranged and configured to move in multiple directions. For example, in one embodiment, the frame 320 may be arranged and configured to move in a first direction to partially move (e.g., slide) to expose a single battery and then move in a second, opposite direction to expose the other battery. Thus arranged, the amount of travel can be minimized resulting in a sturdier, more secure device.

While the present disclosure makes reference to certain embodiments, numerous modifications, alterations, and changes to the described embodiments are possible without departing from the sphere and scope of the present disclosure, as defined in the appended claim(s). Accordingly, it is intended that the present disclosure not be limited to the described embodiments, but that it has the full scope defined by the language of the following claims, and equivalents thereof. The discussion of any embodiment is meant only to be explanatory and is not intended to suggest that the scope of the disclosure, including the claims, is limited to these embodiments. In other words, while illustrative embodiments of the disclosure have been described in detail herein, it is to be understood that the inventive concepts may be otherwise variously embodied and employed, and that the appended claims are intended to be construed to include such variations, except as limited by the prior art.

The foregoing discussion has been presented for purposes of illustration and description and is not intended to limit the disclosure to the form or forms disclosed herein. For example, various features of the disclosure are grouped together in one or more embodiments for the purpose of streamlining the disclosure. However, it should be understood that various features of the certain embodiments of the disclosure may be combined in alternate embodiments. Moreover, the following claims are hereby incorporated into this Detailed Description by this reference, with each claim standing on its own as a separate embodiment of the present disclosure.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

The phrases "at least one", "one or more", and "and/or", as used herein, are open-ended expressions that are both conjunctive and disjunctive in operation. The terms "a" (or "an"), "one or more" and "at least one" can be used interchangeably herein. All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., engaged, attached, coupled, connected, and joined) are to be construed broadly and may include intermediate members between a collection of elements and relative to movement between elements unless otherwise indicated. As such, connection references do not necessarily infer that two elements are directly connected and in fixed relation to each other. All rotational references describe relative movement between the various elements. Identification references (e.g., primary, secondary, first, second, third, fourth, etc.) are not intended to connote importance or priority, but are used to distinguish one feature from another. The drawings are for purposes of illustration only and the dimensions, positions, order and relative to sizes reflected in the drawings attached hereto may vary.

What is claimed is:

1. A battery-powered switch arranged and configured to be mounted to a wall-box or to a surface of a building, the battery-powered switch to wirelessly control a remote electrical control hardwired in series between an electrical power source and an electrical load, the battery-powered switch comprising:
    a base including a front surface;
    a frame pivotably coupled to the base, the frame being pivotably coupled between a first closed position and a second opened position, wherein the frame remains coupled to the base in the first closed position and the second opened position, the frame and the front surface defining a cavity;
    a printed circuit board ("PCB") disposed within the cavity and including a plurality of microswitches and a wireless transceiver, the PCB configured to receive a replaceable battery; and
    a user-accessible actuator coupled to the frame so that the user-accessible actuator is moveable relative to at least a portion of the base, the user accessible actuator arranged and configured to selectively actuate the plurality of microswitches to wirelessly transmit control signals to the remote electrical control,
    wherein when the frame is in the second opened position, the user can access and replace the battery while the battery-powered switch is mounted to the wall-box or the surface of the wall; and
    wherein the frame is pivotably coupled to the base about a longitudinal axis and the actuator is coupled to the frame about a lateral axis, the lateral axis being arranged perpendicular to the longitudinal axis.

2. The battery-powered switch of claim 1, wherein the base and the frame each include a plurality of interconnecting projections and recesses arranged and configured to receive a longitudinal rod therein so that the frame is hingeably coupled to the base.

3. The battery-powered switch of claim 2, wherein the base includes a longitudinal side and a lateral side, the projections and recesses being arranged and configured along the longitudinal side of the base.

4. The battery-powered switch of claim 1, wherein one of the base or frame includes one or more snaps and the other one of the base or frame includes complementary recesses, arranged and configured to selectively secure the frame in the first closed position.

5. The battery-powered switch of claim 1, further comprising a battery holder disposed at least partially within the base, the battery holder arranged and configured to receive the replaceable battery.

6. The battery-powered switch of claim 1, wherein the user-accessible actuator is arranged and configured to flex upon contact by an end-user, the user-accessible actuator flexing to contact one or more of the plurality of microswitches positioned on the PCB.

7. The battery-powered switch of claim 6, the user-accessible actuator includes a first end, a second end, and a vertical center, the vertical center being fixedly coupled to the frame, the first and second ends being arranged and configured as an unsupported cantilever to flex upon contact by the end-user.

8. The battery-powered switch of claim 1, wherein the base is coupled to a wall-box or a building surface, the base also being arranged and configured to couple to a wall-plate.

9. A battery-powered switch arranged and configured to be mounted to a wall-box or to a surface of a wall, the battery-powered switch arranged and configured to wirelessly control a remote electrical control hardwired in series between an electrical power source and an electrical load, the battery-powered switch comprising:
    a base including a front surface; and
    a printed circuit board ("PCB") disposed at least partially within the base, the PCB including a replaceable battery;
    a user-accessible actuator coupled to the base, the user accessible actuator arranged and configured to selectively actuate a plurality of microswitches to wirelessly transmit control signals to the remote electrical control;
    wherein the user-accessible actuator pivotably moves relative to the base from a first closed position to a second opened position, the user-accessible actuator remaining coupled to the base in the first closed position and the second opened position and when the user-accessible actuator is in the second opened position, the user can access and replace the battery while the battery-powered switch is mounted to the wall-box or the surface of the wall; and
    wherein the user-accessible actuator pivotably moves relative to the base between the first closed position and the second opened position about a longitudinal axis and the user-accessible actuator is coupled to the base to selectively actuate the plurality of microswitches about a lateral axis, the lateral axis being arranged perpendicular to the longitudinal axis.

10. The battery-powered switch of claim 9, further comprising a frame coupled to the base, the frame including an aperture arranged and configured to provide access to the user-accessible actuator mounted at least partially within the aperture; the frame being pivotably coupled to the base so that the frame and the user-accessible actuator are arranged and configured to pivot from the first closed position to the second opened position to provide access to the battery.

11. The battery-powered switch of claim 10, wherein the base and the frame each include a plurality of interconnecting projections and recesses arranged and configured to receive a longitudinal rod therein so that the frame is hingeably coupled to the base.

12. The battery-powered switch of claim 10, wherein the base and frame include one or more snaps and the other one of the base or frame includes complementary recesses arranged and configured to selectively secure the frame in the first closed position.

13. The battery-powered switch of claim 10, further comprising a battery holder disposed at least partially within the base, the battery holder arranged and configured to receive the replaceable battery.

\* \* \* \* \*